(12) United States Patent
Dambman et al.

(10) Patent No.: US 12,115,668 B2
(45) Date of Patent: Oct. 15, 2024

(54) USE OF MOBILE ROBOTICS IN SELF-ASSEMBLING WORKCELLS OF COMPLEX WORKFLOWS

(71) Applicant: Biosero Inc., San Diego, CA (US)

(72) Inventors: Jonathan David Dambman, San Diego, CA (US); Stephen Paul Testen, San Diego, CA (US); Ryan Patrick Banks, Ramona, CA (US); Thomas Herbert Gilman, Del Mar, CA (US)

(73) Assignee: Biosero Inc., San Diego, CA (US)

( * ) Notice: Subject to any disclaimer, the term of this patent is extended or adjusted under 35 U.S.C. 154(b) by 424 days.

(21) Appl. No.: 17/651,850

(22) Filed: Feb. 21, 2022

(65) Prior Publication Data

US 2022/0266445 A1 Aug. 25, 2022

Related U.S. Application Data

(63) Continuation of application No. PCT/US2022/070747, filed on Feb. 20, 2022.
(Continued)

(51) Int. Cl.
*B25J 9/16* (2006.01)
*B25J 9/00* (2006.01)
(52) U.S. Cl.
CPC ............. *B25J 9/163* (2013.01); *B25J 9/0084* (2013.01); *G05B 2219/39001* (2013.01)
(58) Field of Classification Search
CPC ............. B25J 9/163; B25J 9/0084; G05B 2219/39001; G06Q 50/04
See application file for complete search history.

(56) References Cited

U.S. PATENT DOCUMENTS

2002/0078432 A1* 6/2002 Charisius ........... G06Q 10/0633
717/102
2002/0147515 A1* 10/2002 Fava ................... G01N 35/0099
700/95
(Continued)

OTHER PUBLICATIONS

WIPO, PCT Form ISA210, International Search Report for International Patent Application Serial No. PCT/US2022/070747, pp. 4 (Jun. 15, 2022).
(Continued)

*Primary Examiner* — Jonathan L Sample
*Assistant Examiner* — Mohammed Yousef Abuelhawa
(74) *Attorney, Agent, or Firm* — UltimatEdge IP Law Group, P.C.; Dean G. Stathakis

(57) ABSTRACT

A framework for self-assembly of workcells includes analyzing multiple constraints to determine configuration and movement of mobile robots and/or one or more robotic devices in the performance of workflows. The framework includes multiple elements that model a deployment and transportation strategy in a rules engine for identifying and allocating available workcell resources, and generates configuration schemes and pathway topologies that govern the self-assembly of workcells and execution of workflows using such workcells. The framework is applicable to single or multi-robot configurations, and enables self-assembly of each workcell in a single path or in multiple paths. The framework is further applicable to multiple item processing scenarios, such as round robin processing, batch processing, or both, and accounts for multiple handling and processing actions. The framework further includes a machine learning engine for additional processing of workcell and workflow constraints to improve deployment and transportation outcomes.

20 Claims, 3 Drawing Sheets

Related U.S. Application Data

(60) Provisional application No. 63/151,953, filed on Feb. 22, 2021.

(56) References Cited

U.S. PATENT DOCUMENTS

| | | | |
|---|---|---|---|
| 2009/0138318 A1* | 5/2009 | Hawkins | G06Q 10/06 |
| | | | 705/7.27 |
| 2017/0372442 A1* | 12/2017 | Mejias | G16H 40/20 |
| 2018/0085914 A1 | 3/2018 | Kuffner et al. | |
| 2020/0094411 A1* | 3/2020 | Tan | B25J 9/1661 |
| 2020/0171647 A1* | 6/2020 | Theobald | G05D 1/0088 |
| 2021/0110301 A1* | 4/2021 | Singh | G06Q 10/10 |
| 2022/0019204 A1* | 1/2022 | Maury | G05B 19/4188 |

OTHER PUBLICATIONS

WIPO, PCT Form ISA237, Written Opinion for International Patent Application Serial No. PCT/US2022/070747, pp. 10 (Jun. 15, 2022).

\* cited by examiner

USE OF MOBILE ROBOTICS IN SELF-ASSEMBLING WORKCELLS OF COMPLEX WORKFLOWS

This 35 U.S.C. § 111 patent application claims the benefit of priority and is entitled to the filing date pursuant to 35 U.S.C. § 119(e) of U.S. Provisional Patent Application 63/151,953, filed Feb. 22, 2021, and is a 35 U.S.C. § 111 patent application claims the benefit of priority and is entitled to the filing date pursuant to 35 U.S.C. § 120 of International Patent Application PCT/US2022/070747, filed Feb. 20, 2022 the content of which is hereby incorporated by reference in its entirety.

FIELD

The present invention relates to the field of robotics and performance of robot-based processes. Specifically, the present invention relates to a system and method that provides a seamless, automated self-assembly of workcells, for execution of workflows involving robotic equipment, particularly in the performance of laboratory tasks in the field of life sciences. The present invention also relates to a system and method for integrating one or more mobile robotic platforms with self-assembling workcells for the performance of such workflows.

BACKGROUND

In environments where complex workflows are performed, such as processing medical samples or performing medical tests in a laboratory setting, many different workcells, or tasks, may be required. Each workcell may involve the use of one or more pieces of robotic equipment, together with (or in lieu of) humans.

There are many existing approaches to organizing activities involving automated equipment, for example in the performance of laboratory tasks and experiments. Traditional organization and execution of workcells focus on obtaining a high throughput, but difficulties persist in quickly and seamlessly organizing workcells, particularly for time-sensitive or otherwise urgent tasks, as well as in executing workflows involving multiple processes performed by workcells to accomplish such tasks, adapting equipment for other uses, and in using robotic instruments offline, particularly by humans, not at least because a robot is typically constrained to a table or other workspace.

In addition, existing approaches are limited in scalability, as they do not account for optimized or efficient integration of multiple instruments at multiple locations, and are not capable of identifying and scheduling either optimal timing of workcells, or robot movement along the multiple paths which activity occurs for carrying out a sophisticated workflow. These existing approaches are further constrained by difficulties in managing different robotic equipment configured with different workcells involved in the performance of tasks and experiments, and in allowing for fully interleaved processes, such as where a set of instruments on a piece of robotic equipment can be shared by multiple methods running simultaneously, or where robotic instruments are capable of performing multiple processes within a workcell.

Accordingly, there is a continuing need in the existing art for tools that are able to account for different configurations of robotic instruments in a workcell, and enable such a workcell to automatically or self-assemble. There is also a continuing need in the existing art for tools that enable self-assembly of workcells in the performance of multi-phase or sophisticated workflows in a laboratory or other setting. There is a further continuing need in the existing art for tools that model available workcell resources based on one or more workcell and/or workflow constraints, and generate schemes for both a configuration governing deployment of such resources, and a topology governing mobility and transportation of workcells in performance of a workflow.

SUMMARY

It is therefore one objective of the present invention to provide a system and method for enabling a self-assembly workcells involving robotic equipment. It is also an objective of the present invention to provide a system and method for integrating such self-assembled workcells to perform workflows in a setting requiring automated processes where complex tasks are performed such as in a laboratory setting. It is another objective of the present invention to implement an approach for a self-assembly of workcells, and execution of workflows using such workcells, where both a mobile robotic platform represents a workcell, and where multiple robotic devices are implemented in such a mobile robotic platform.

It is yet another objective of the present invention to provide a system and method of modeling both a configuration scheme for a deployment of resources in a self-assembly of workcells, and pathway topologies governing transport and mobility of such resources in executing workflows. It is still another objective to provide a system and method for implementing one or more techniques of machine learning to simulate configuration schemes and pathway topologies for improvements in the modeling performed.

It is a further objective of the present invention to automate the self-assembly of workcells, and performance of workflows involving such workcells, for applications not involving laboratory tasks and outside the field of life sciences. Examples of such non-life sciences applications include, but are not in any way limited to, packaging and shipping of consumer goods, facilitating safe and effective human transportation, and managing the manufacturing of highly complex, multi-part industrial products such as heavy machinery, airplanes, automobiles, rolling stock, and commercial ships.

The present invention provides an approach for modeling and simulating configuration schemes for automatic, or self, assembly of workcells, and pathway topologies for mobility and transport of such workcells, as well as executing the automatic assembly of the workcells to perform workflows using mobile robots and/or one or more robotic devices. This approach is performed in one or more systems and methods that analyze workcell and workflow constraints that represent spatial and temporal requirements of workflows and spatial and temporal limitations of workcells, as well as of samples/items to be processed, labware, and equipment involved in workcells, and the environment surrounding the workcells itself, which are defined in workflow order and scheduling information defining workflow steps, and operational workcell capabilities representing available workcell resources. This information is processed to identify and allocate the available workcell resources for performance of a workflow, determine a deployment strategy for allocated workcell resources, and identify and select a pathway topology. The present invention then applies a configuration scheme representing this deployment strategy, and the selected pathway topology for a self-arrangement of each workcell for executing one or more workflow steps. The present invention is therefore a tool for enabling self-assembly of robotic devices, and resolving pathways for executing operations of such devices in the performance of laboratory workflows.

The present invention may be used in single or multiple robot configurations, may involve self-assembly of each workcell in a single path or in multiple paths, and may also be applicable to many different item processing scenarios, such as parallel processing, round robin processing, and batch processing. The present invention may also define multiple handling and processing actions such as storage, shaking, and the performance of specific on-board specimen analytics.

The present invention may also provide an easy-to-use interface, such as for example via a support tool, in which a user may drag and drop representations of operations, devices or robots to automatically configure them, and defines the operations to be performed by these devices or robots. The user may also be able to run the processes encompassing these operations using such as interface. The interface also provides the ability to monitor progress of workflows, and make modifications and adjustments as needed during performance thereof.

The approach of the present invention is applicable in any environments where complex workflows are performed. For example, the present invention may be able to workflow environments that involve processing medical samples or performing medical tests in a laboratory setting, as well as those involving drug and/or discovery, and any other life sciences application. It is to be understood that the approach of the present invention is offers the ability to adapt rapidly to the changing needs of testing, processing, and discovery across a wide array of life sciences applications, complex or otherwise, and therefore that the applicability of the present invention is not to be limited to any particular life sciences application specifically mentioned herein.

Further, the approach of the present invention is also widely applicable to robotic workflows in activities other than those involving the completion of life sciences tasks. For example, the present invention's scheduling and integration aspects may be applied to the performance of any industrial activity involving multiple pieces of robotic equipment or process performed by such equipment, such as packaging consumer goods and preparing and delivering a package for shipment in response to a customized order, or in human transportation systems, or as noted above in the manufacture of highly complex, multi-part industrial products. Regardless of the industrial or commercial application, where retooling would traditionally be required to produce various configurations, such retooling may be automated based a needed production schedule that can change often, for example daily, using the approach of the present invention.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings.

DETAILED DESCRIPTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

In a laboratory setting where complex tasks and experiments are conducted, a workflow may be considered as one or more steps in performing a process. A workcell may be considered as one or more devices, and/or locations, for performing a task or tasks in a workflow. Workcells may therefore be considered as an integration of equipment for performing such tasks, where most of the core capabilities necessary for these tasks can be configured on a platform that can dock against stationary instruments or workstations. Such equipment may also be considered as different components of larger, self-assembling workcells that performing multiple tasks, which may be either mobile or stationary. Regardless, both workflows and workcells may be defined and constrained by temporal characteristics and requirements. In such a laboratory setting, a workflow may be characterized as process-level, whereas a workcell may be characterized as one or both of device-level and spatiotemporal within the workflow.

Figure 1:
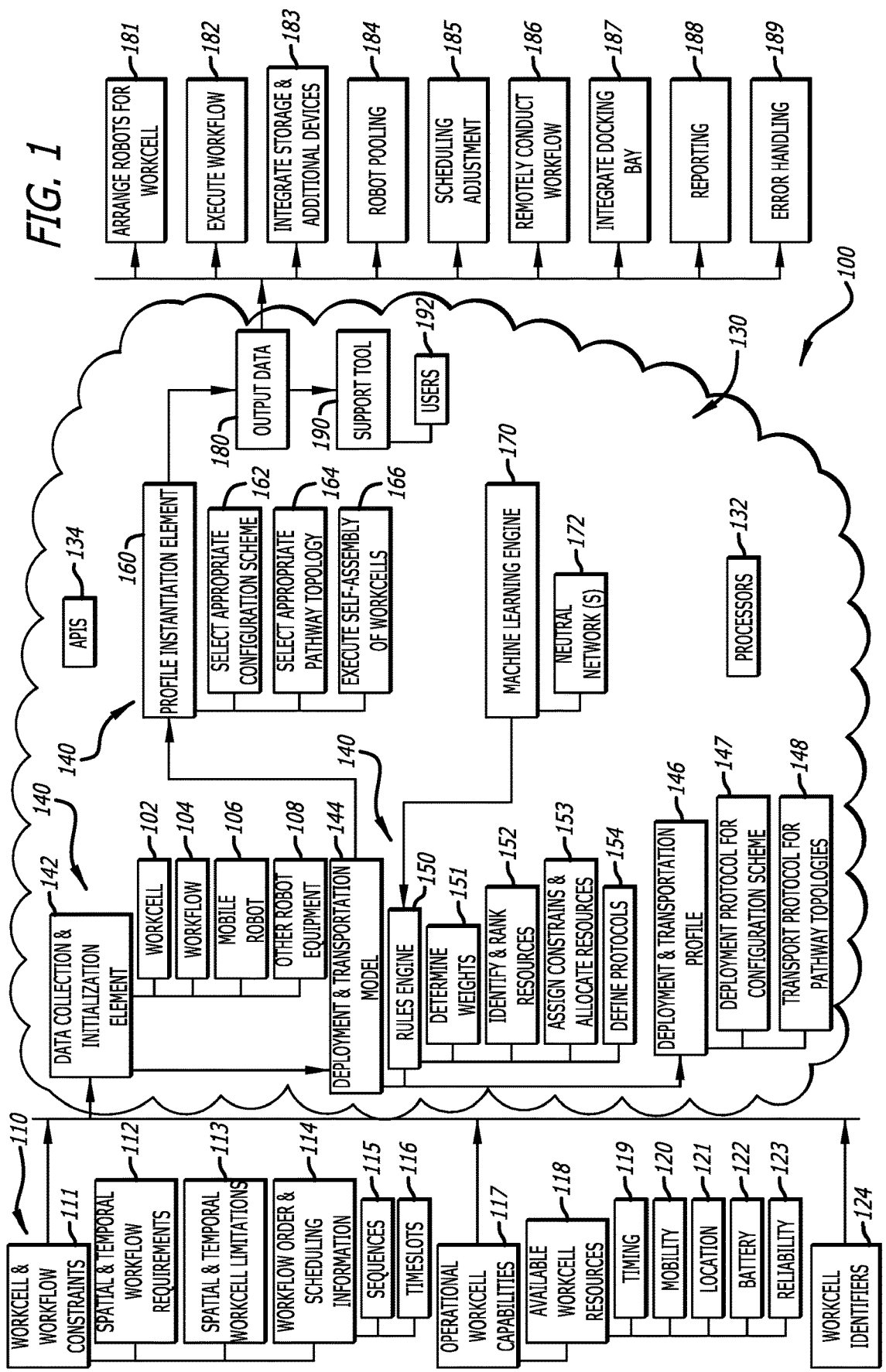
FIG. 1 is a system diagram for a framework for performing a self-assembly of workcells disclosed herein.

FIG. 1 is a system diagram of a framework 100 for performing an automated self-assembly of workcells 102 of integrated equipment, and executing the automated self-assembly of workcells 102 to perform workflows 104, for example using a platform configured with one or more mobile robots 106, where the integrated equipment includes one or more robotic devices or equipment 108 mounted on such a platform. Framework 100 of the present invention is performed within one or more systems and/or methods, that include several processing elements each of which define distinct activities and functions involved in analyzing input data 110 to model a deployment and transportation strategy for such a self-assembly of workcells 102 and execution of workflows 104 involving multiple tasks and experiments.

Workcells 102 in the present invention may have many different compositions. Generally, workcells 102 are comprised of one or more devices configured to perform tasks in a workflow 104. Workcells 102 may be stationary, where all tasks are performed within a contained environment or a fixed location, or may be mobile, where workcell 102 travels along one or more paths to different locations. Many exemplary compositions are possible, and within the scope of the present invention. For example, workcell 102 may be comprised of a mobile robot 106, where mobile robot 106 is itself workcell 102. Alternatively, mobile robot 106 may travel between workcells 102, and multiple workcells 102 may instantiated and assembled in any given workflow 104. Regardless, is to be understood that the present disclosure shall be limited to any specific composition of a workcell or workcells 102 described herein.

Similarly, it is to be understood that the present invention is not to be limited to any particular type of workflow 104 performed, and that framework 100 of the present invention may be applied to any field and any process where automated control of tasks performed by robots 106, robotic devices or equipment 108, and any other computer-controlled device is desired. Accordingly, input data 100 may include information representing any subject matter for which an automated process is to be utilized. For example, the workflow may be packaging, and the automated process may be a workflow for identifying an item to be shipped, preparing the item in a package, and scheduling a shipment of the package. Many types of workflows 104 are therefore possible and are within the scope of the present invention.

Framework 100 receives, ingests, requests, or otherwise obtains input data 110 that includes multiple types of information relative to workcells 102 and workflows 104. Input data 110 generally includes a plurality of workcell and workflow constraints 111 relative to a performance of a workflow or workflows 104 for a laboratory process, where such a process is the focus of workflow 104. Workcell and workflow constraints 111 at least represent spatial and temporal workflow requirements 112 for a workflow 104, and spatial and temporal workcell limitations 113 of each workcell 102, as well as for samples/items to be processed, labware, and equipment involved in workcells, and the environment surrounding the workcells itself.

Other requirements and limitations are contemplated within input data 110, and it is to be understood that spatial and temporal requirements 112 for a workflow 104, and spatial and temporal workcell limitations 113 of each workcell 102, may each be considered as a subset of overall requirements and limitations that are possible within each workcell 102 and workflow 104. Therefore, input data 110 of framework 100 of the present invention is not to be limited only to spatial and temporal requirements 112 for a workflow 104, and spatial and temporal workcell limitations 113 of each workcell 102, and many other possibilities of input data 110 are also within the scope of the present invention.

Workcell and workflow constraints 111 also include workflow order and scheduling information 114 defining a workflow order for at least one workflow 104. The workflow order and scheduling information 114 may include a work order identifier, and also may include parameters of the at least one workflow that include one or more sequences 115 for executing the performance of the at least one workflow during required timeslots 116. The workflow order and scheduling information 114 may also include one or more outputs of scheduling software that include instructions for such parameters, for example as get, handoff, and put sequences representing the one or more sequences 115.

Workcell and workflow constraints 111 also include operational workcell capabilities 117 representing available workcell resources 118. The available workcell resources 118 may represent workcell characteristics, such as for example timing requirements 119, mobility 120, location 121, battery characteristics 122, and historical reliability 123 of each workcell 102 whose utility is being modeled in framework 100.

Many other such workcell characteristics are also possible and within the scope of the present invention, and it is to be understood that neither this disclosure, nor any claim, is to be limited to any specific workcell characteristic or operational workcell capability 117 referenced herein. For example, operational workcell capabilities 117 may also include, but are not in any way limited to, real-time load distribution for equipment utilized within a workcell 102, and any capabilities of the specific instruments deployed on or with a workcell, such as volume range and transfer range (smallest and largest volumes the instrument is able to transfer), accuracy, and labware compatibility with other pieces of equipment or with the workcell itself.

Workcell and workflow constraints 111 may further include workcell identifiers 124. Workcell identifiers 124 include information such as equipment data which defines the robotic (and other) equipment to be assembled and/or integrated in conjunction with workcell 102, such as mobile robots 106 and robotic devices or equipment 108 configured thereon. For example, workcell identifiers 124 may define the type of robot, the manufacturer, product specifications, device drivers, operating systems and versions installed therewith, and other information relevant to planning for the assembly and use of equipment in executing workflows 104.

Many other types of input data 110 are also possible, and within the scope of the present invention. For example, input data 110 may also include biological or other content data information, such as content or material specifications pertaining to items to be analyzed or processed. By way of example, such content data may include a sample identification, such as one comprising tissue, blood, urine or sample, or other type of biological material to be tested. At least where the content is related to a laboratory or life sciences workflow 104, it is to be understood that any type of biological content or material may be identified, and therefore the present invention is not to be limited to any specific type of content or material described herein.

Still further, workcell and workflow constraints 111 may also include information provided by a data services modeling framework within a broader orchestrator environment that is primarily centered around dependency management and movement of data, as well as samples and consumables in the laboratory, to ensure that each workflow 104 is executed correctly, on time, and efficiently. Such a data services modeling framework may be responsible for analyzing and modeling state changes within the orchestrator environment, and therefore may generate information for the framework 100 that represents changes in events within laboratory workflow 104. Such information provides contextualization that explain state changes in events, and therefore input data 110 may include contextualized event data that is used in the framework 100 to execute actions that improve the self-assembly of workcells 102 and execution of workflows 104 involving multiple tasks and experiments. Contextualized event data may be derived from many types of information and from many different sources, such as from an Internet-of-Things (IoT) network that includes one or more IoT sensors associated with one or more of an area, a building, a structure, a portal, a device, or any other physical item within an IoT network and which is relevant to the self-assembly of workcells 102 and the performance of workflows 104.

Input data 110 is applied to a plurality of data processing elements 140 in framework 100 that are components within a computing environment 130 that also includes one or more processors 132 and a plurality of software applications and hardware devices. The one or more processors 132 and plurality of software applications and hardware devices are configured to execute program instructions or routines to perform the algorithms comprising the data processing functions described herein, and embodied within the plurality of data processing elements 140.

The plurality of data processing elements 140 include a data collection and initialization element 142, which is configured to receive, ingest, request, or otherwise obtain input data 110 as noted above. The data collection and initialization element 142 may also initialize input data 110 and framework 100, by configuring characteristics of workcells 102, workflow 104, and mobile robots 106 following processing of input data 110 in framework 100. Several other elements 130 may be included in the plurality of data processing elements 140, as further described herein, for performing data processing functions such as developing a deployment and transportation profile 146, and applying deployment and transportation profile 146 to and instantiate one or more of a defined configuration scheme 162 and a defined pathway topology or topologies 164 for workcell 102, and execute a self-assembly 166 of the one or more workcells 102, as further described herein. Additionally, one or more data processing elements 140 may be performed in conjunction with techniques of artificial intelligence by applying a machine learning modeling engine 170 to further simulate and model outcomes as deployment protocols for configuration schemes 147, and transportation protocols for pathway topologies 148.

Pathway topologies 148 may have any configuration. For example, a pathway topology may define a straight, a curved line, multiple segments of either straight or curved lines, a circle, or any other shape.

The deployment and transportation profile 146 is developed within the data plurality of data processing elements 140 in a deployment and transportation model 144. The deployment and transportation model is embodied in a plurality of algorithms that perform various mathematical calculations and execute various instructions in computer code that programmatically execute such algorithms to develop and apply a rules engine 150 to the initialized input data 110, to define both configuration schemes 147 for the equipment to be assembled as a workcell 102, and the one or more pathway topologies 148 that define and guide mobility of self-assembled workcells 102 for the performance of a workflow 104. The deployment and transportation profile 146 may include both deployment protocols governing workcell configuration schemes 147, and transportation protocols governing workcell pathway topologies 148, which together enable instantiation of self-assembly of workcells 102.

Rules engine 150 models input data 110 to develop the deployment and transportation profile 146 in one or more algorithms which are configured to execute various modeling steps in process the information in that input data 110. This includes one or more algorithms that determine weights 151, which are coefficients representing a relevance of operational workcell capabilities. Such a weighted relevance is analyzed by, in one embodiment of the present invention, evaluating input data 110 to assign importance to either particular characteristics for each task to be performed, such as for example a minimum time for each get, handoff, and put sequence, an importance of a particular workcell characteristics to each task, such as for example mobility 120, location 121, or battery capacity 122 of mobile robots 106 or robotic devices or equipment 108 (or other equipment) being utilized in workcell 102. Task characteristics that may be relevant factors in the determination of such coefficients include the nature of the specimen being processed (for example, taking into account a quality, temperature, and age of a specimen) and speed needed in executing such tasks given the nature of the specimen being processed and the requirements of the assay being performed. It is to be understood that many other factors may be relevant to determining coefficients in the present invention, and are within the scope of the present invention.

Rules engine 150 may determine the weighted relevance to be applied to input data 110 using any known method for evaluating parameters and assigning particular coefficients thereto. For example, where the rules engine 150 evaluates a mobility 121 and/or a location 122 of a mobile robot 106, it may calculate and apply weights for equipment that is located a certain distance from other stations to be involved in workflow 104. Alternatively, a weighting by distance scheme may be applied, where weights are assigned by applying inverse distance weighting to allocate spatially nearer equipment with more influence, as opposed to equipment with more appropriate battery characteristics 122, or greater historical reliability 123. Any type of algorithm may be applied to determine, adjust, allocate, and model weights in rules engine 150, and again it is to be understood that the present invention is not to be limited to any one approach referenced herein. For example, weights may also be determined based at least in part on equipment maintenance schedules, calibration data, and any other characteristic that is relevant to performance of tasks by mobile robot 106.

Regardless of the approach used to determine such coefficients, rules engine 150 uses this weighted relevance to identify and rank 152 available workcell resources 118 that have operational workcell capabilities 117 that match the requirements of workflow 104, and which are temporally available during required timeslots 116, for the performance of the tasks involved in workflow 104. Rules engine 150 then assigns 153 workcell and workflow constraints 111 based on the parameters to workflow 104, and allocates an available workcell resource 118 for each sequence 115 and each timeslot 116.

Rules engine 150 then identifies deployment and transportation protocols 155, representing possible configurations schemes and pathway topologies for performing each sequence 115 defined by the spatial and temporal requirements 112 of workflow 104, and spatial and temporal limitations 113 of each workcell 102. Rules engine 150 then compiles a deployment and transportation profile 146 that defines these possible configurations schemes and pathway topologies for the available workcell resources 118 assigned to workflow 104. The deployment and transportation profile 146 therefore includes both deployment protocols 147 for configuration schemes for self-assembly of workcells 102, and transportation protocols 148 for pathway topologies defining movement of self-assembled workcells 102.

Framework 100 then applies the deployment and transportation profile 146 to a profile instantiation element 160. Profile instantiation element 160 executes instructions for performing one or more further algorithms which select appropriate configurations schemes 162 and appropriate pathway topologies 164 based on the protocols 147 and 148 defined in the deployment and transportation profile 146 at the appropriate times for arranging a self-assembled workcell 102 for performing a workflow 104, and which execute a further protocol to perform the self-assembly 166 of such workcells 102. These instructions may also be provided as output data 180 of framework 100, and may be parsed and communicated to one or more mobile robots 106, robotic devices or equipment 108, and any other relevant equipment to arrange as a workcell 102. The instructions generated by profile instantiation element 160 therefore enable framework 100 to communicate with one or more mobile robots 106 the one or more of the robotic devices or equipment 108, and other equipment or a workcell 102, and orchestrates an arrangement 181 as the self-assembly 166 of robotic and other equipment into a workcell 102, which is then applied to execute a workflow 104.

Output data 180 of framework 100, and the instructions which output data 180 may be embodied, may take many forms. For example, as noted above, output data 180 may be instructions to arrange 181 a mobile robot 106 (and/or, arrange multiple robotic devices or equipment 108 and other equipment on a mobile platform) in order to self-assemble 166 a workcell 102. Output data 180 may also be embodied as instructions to execute 182 a workflow 104 that includes one or more workcells 102, regardless of whether those workcells 102 are self-assembled.

Output data 180 may also be embodied as instructions to integrate additional components or devices, and/or storage elements 183 on board platforms in a self-assembly 166 of a workcell 102 for executing a workflow 104. Output data 180 may further be embodied as instructions to pool 184 one or more mobile robots 106 and/or robotic devices or equipment 108, for example to provide scalable throughput for a workflow 104, or to pool one or more mobile robots 106 with human workers. Output data 180 may also be embodied as instructions to adjust 185 scheduling information for a workcell 102 or workflow 104, to remotely conduct 186 a workflow 104, to generate performance or regulatory reports 187, and to integrate a docking bay 188 with the workcell 102 or other devices or components that are not mounted on a mobile platform or mounted with robotic equipment 106, such as stationary equipment to which a workcell 102 travels, in the performance of a workcell 102 or workflow 104. Still further, output data 180 may include a reporting function, such as for example performance or regulatory reports 188. Still further, output data 180 may include error handling information 189, which is applicable for example in case of failure, where a second robot may be instantiated, or a human approves the second robot to finish a task or tasks remaining in a workflow 104. Output data 180 may also include a quality control function, for example where one batch of results can be compared with other batch processing occurring elsewhere. Output data 180 may also include specific, intra-workcell 102 instructions, for example to adjust a load distribution of equipment used to perform tasks within a workcell 102 or workflow 104.

Output data 180 may also serve as input data for an entirely new process. For example, the output of a single point compound screen may generate a list of compounds that have an effect on a disease target. This may be fed back into a dose response screen to determine the concentrations at which that effect is optimum.

Output data 180 may, in one embodiment of the present invention, be applied to a support tool 190, which may be utilized to configure one or more aspects of framework 100. For example, support tool 190 may allow users 192 to adjust aspects of the deployment and transportation model 144, rules engine 150, or machine learning modeling engine 170. Support tool 190 may also be utilized to view and utilize the output data 180 as needed by the user for self-assembly of workcells 102, execution of workflows 104, or both.

Various aspects of framework 100 may be configured in a number of ways using support tool 190. For example, workcell 102 or workflow 104 may be initialized by a user 192 via support tool 190, such as via an application resident on a computing device and/or using a graphical user interface. User 192 may select a specific laboratory process in which workcell 102 or workflow 104 may be accomplished, and configure various aspects of the laboratory process, such as timing, type of process, specimen identification, temperature limitations, and storage requirements. User 192 may also configure various characteristics of each mobile robot 106, robotic device and equipment 108, or other equipment utilized in conjunction therewith, for example a field of view of a camera affixed to robotic device and equipment 108. User 192 may also be able to enter or adjust specific parameters representing operational workcell capabilities 117, as well as enter or adjust preset weights or coefficients that are applied to such parameters. It is to be understood that any number of parameters or characteristics of a workcell 102, workflow 104, mobile robot 106, or robotic device or equipment 108, may be configured with support tool 190, and therefore the scope of the present disclosure is not to be limited to any particular use of support tool 190 that is discussed herein. Regardless, support tool 190 also includes capabilities that allows for user interaction via widgets, drop-down menus, and other indicia presented via a graphical user interface that allow user 192 to make selections and perform functions attendant to operation of framework 100.

Framework 100 may also be configured to monitor the performance of a self-assembly 166 of a workcell 102 an/or the performance of a workflow 104, and may ingest additional workcell and workflow constraints representing adjustments to the laboratory process. The adjustments to the laboratory process may be generated by a dynamic adjustment of the workflow order and scheduling information 114 by user 192, or by changes to at least the spatial and temporal limitations 113 of each workcell 102 as the items are processed in workflow 104. User 192 may utilize support tool 190 for such a dynamic adjustment of input data 110. Such dynamic adjustments may occur in real-time, for example to compensate for errors occurring during performance of a workflow 104 or self-assembly 166 of a workcell 102.

Access to framework 100 of the present invention may be provided through one or more application programming interfaces (APIs) 134. The present invention contemplates that many layers of APIs 134 may be utilized within framework 100, for example to enable ingest of particular forms of input data 110, or customized uses of the output data 180. One layer of APIs 134 may be utilized to connect feeds of input data 110 with framework 100 itself, and different APIs 134 may be provided for each type of input data 110, for example where different types of input data 110 have different formats and content, or are ingested from different sources. APIs 134 may be managed by an API element specifically configured for each implementation thereof, for example as a specific sub-element of the data collection and initialization module 142 for intake of certain types of information that require a particular format or conversion from a particular format, and the data collection and initialization module 142 may itself be thought of as a layer of APIs 134 configured to ingest input data 110.

A further layer of APIs 134 may be utilized to ingest certain information for specific portions of the machine learning modeling engine 170. For example, the data collection and initialization module 142 may retrieve historical records via an API 134 that provides this information directly to the processing performed by one or more neural networks 162, and extracts information from such historical records for further analytics in the various data processing elements 140 of framework 100.

APIs 134 may also be utilized to enable messaging within framework 100, for example to communicate real-time operational messages or status messages. APIs 134 may also be utilized for monitoring of activities occurring during performance of workflow 104, or self-assembly 166 of a workcell 102, and for creating and displaying dashboards of information, for example of an operational status.

A further layer of APIs 134 may be provided for output data 180. One or more APIs 134 may be developed to enable the follow-on forms of output data 180 as discussed above. Third parties, for example, may utilize such APIs 134 to develop their own, follow-on uses of the output data 180, such as to generate and export customized reports, comply with regulatory requirements, generate recommendations, risk assessments, or alerts, or develop their own enterprise-specific applications. APIs 134 may also be provided to enable customized interfaces via support tool 190.

As noted above, framework 100 of the present invention may also include a machine learning modeling engine 170, which may be utilized to improve an understanding of input data 110 by examining outcomes of prior, known configuration schemes and pathway topologies to assist the deployment and transportation model 144 to identify as yet unknown schemes and topologies based on those outcomes. Machine learning modeling engine 170 may, in one embodiment of the present invention, be comprised of one or more algorithms that apply techniques of supervised learning, reinforced learning, and other approaches of machine learning further evaluate input data 110 to develop and apply rules engine 150, and increase its accuracy, and generate, in conjunction with deployment and transportation model 144 and profile instantiation element 160, a self-assembly of unknown workcell resources by analyzing the outcomes of prior, known configuration schemes and pathway topologies.

These one or more algorithms may be embodied in one or more neural networks 162 that are instantiated to further perform this further evaluation of input data 110 to improve the performance of rules engine 150 generally, and to analyze available workcell resources 118 in the performance of workflows 104. Machine learning modeling engine 170 may be configured apply prioritization rules to determine the most appropriate configuration scheme 162 and most appropriate pathway topology 164 in response to workcell and workflow constraints 111, based on prior instances where those constraints 111 resulted in outcomes that produced the most appropriate configuration schemes 162 and pathway topologies 164 for similar workcells 102 and workflows 104, and for similar robots 106 or robotic devices or equipment 108.

Neural networks generally are comprised of nodes, which are computational units having one or more biased input/output connections. Such biased connections act as transfer (or activation) functions that combine inputs and outputs in some way. Nodes are organized into multiple layers that form a neural network. There are many types of neural networks, which are computing systems that "learn" to perform tasks, such as modeling configuration schemes and pathway topologies, and selecting appropriate schemes and topologies, without being programmed with task-specific rules, based on examples.

Neural networks generally are based on arrays of connected, aggregated nodes (or, "neurons") that transmit signals to each other in the multiple layers over the biased input/output connections. Connections, as noted above, are activation or transfer functions which "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e. decay) over time, as a system learns what weights should be, and how they should be adjusted, for example due to spatial and temporal workflow requirements 112, and spatial and temporal workcells limitations 113. In other words, neural networks evolve as they learn, and the mathematical formulas and functions that comprise neural networks design can change over time as a system improves itself.

Neural networks 162 instantiated as part of machine learning modeling engine 170 may be applicable in one or more of the deployment and transportation model 144, rules engine 150, and profile instantiation element 160, particularly where modeling of spatial and temporal characteristics related to workcell and workflow constraints 111 involve determining and assigning weights for evaluating available workcell resources 118, and ranking those resources 118 for application of the rules engine 150 to configure a profile 146 governing the self-assembly of a workcell 102 and performance of a workflow 104. For example, a neural network 162 trained on historical time records representing how long each robot needs to transfer a plate may improve the resulting processing required to correctly configure a scheme comprised of multiple robotic devices or equipment 108 according to rules developed that account for such temporal constraints, and calculate a most appropriate pathway topology 164 to facilitate the transfer. This may be particularly important where configuration schemes and pathway topologies must be calculated in time-sensitive situations that require a fast and accurate response.

Figure 2:
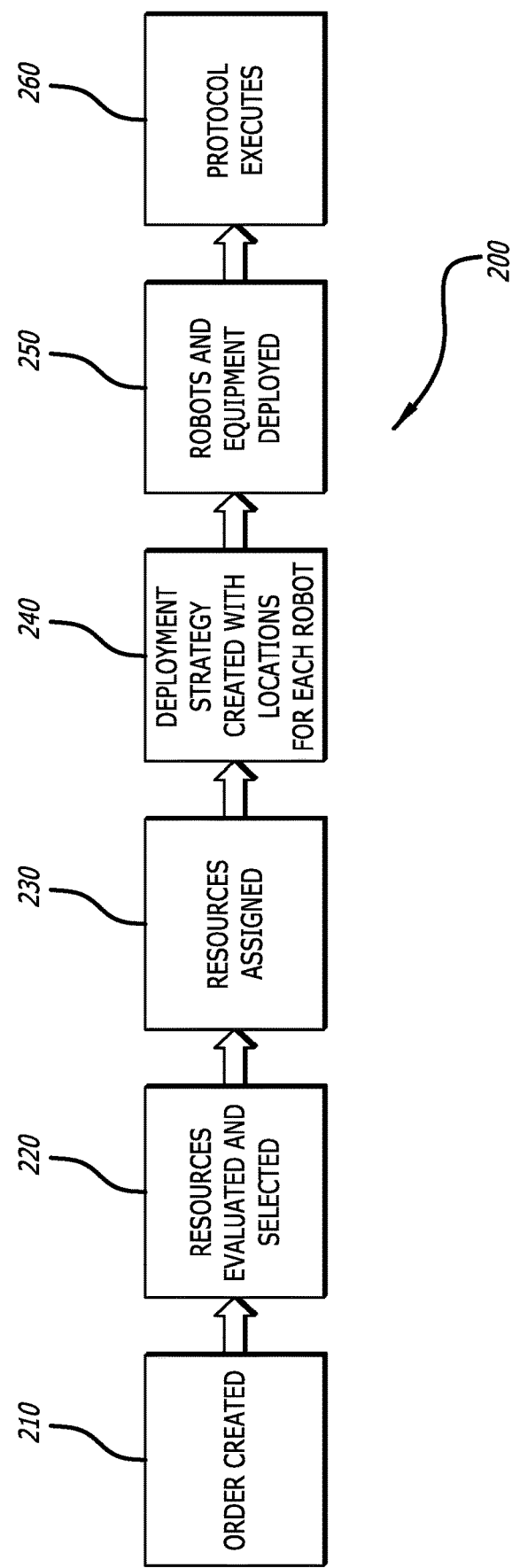
FIG. 2 is a block diagram of an exemplary systemic process of initiating a self-assembly of workcells according to the framework of FIG. 1.

FIG. 2 is a block diagram showing an exemplary scheme for initiating a self-assembly of workcells 102 according to framework 100 of the present invention, and execution of a workflow 104 using such a self-assembly of workcells 102. Referring to FIG. 2, framework 100 is initialized by receipt of data representing instructions to create an order 210. Information representing such instructions to create an order 210 may be embodied in input data 110, for example in the order and scheduling information 114, where an order is identified, and parameters relevant to the order details such as sequences 115 and timeslots 116, and scheduling data relative to one or more aspects of a workflow 104, are provided.

Each order has a unique identifier, and may have any number of input parameters. Additionally, each order has a series of workflow steps to be executed. Each workflow step is defined by a resource requirement, such as instrument or robotic device 108, and the parameters that define or constrain the resource use and operation thereof, as well as any additional constraints, such as timing constraints or required capabilities. Orders may be created by users 192 either dynamically or by selection of a preexisting order template, for example using the support tool 190. Orders may also be generated automatically as a downstream step triggered by the outcome of a previous operation, order, or workflow.

Data included in order and scheduling information 114 may be used to evaluate and select resources at block 220 in available workcell resources 118 that are required for a self-assembly of workcells 102, and framework 100 may further request or ingest additional data relative to those resource requirements. For each of the available workcell resources 118 in each workflow step, framework 100 may perform several evaluations. For example, framework 100 may generate a list of all available resources 118 with operational workcell capabilities 117 that meet the workflow step's requirements and are available during the necessary timeslots 116. Each available resource 118 in such a list is evaluated and ranked based on any additional constraints, such as timing requirements 119, location 120, mobility 121, battery capacity and charge 122, historical reliability 123, and any other relevant characteristic. An available workcell resource 118 may be preliminarily selected for each workflow step at this stage, or may be based on a later ranking of available workcell resources 118. Conversely, if any workflow steps do not have an available workcell resource 118, the order is flagged as currently unachievable due to resource constraints, and framework 100 either halted or re-initialized with new data.

At blocks 230 and 240, the deployment and transportation model 144 begins to analyze available workcell resources 118, which are assigned to the order created, and allocated for the required timeslot 116. This may include incorporating additional temporal elements to account for travel or deployment time that may be necessary in a worst case or accident scenario, such that framework 100 may be able to account for and anticipate events which interrupt or slow down a self-assembly of a workcell 102, or performance of a workflow 104.

Deployment and transportation model 144, in conjunction with rules engine 150 and machine learning modeling engine 170, analyzes input data 110 to develop and select a deployment and transportation strategy, in deployment protocols for configuration schemes 147 and transportation protocols for pathway topologies 148, for each workflow step represented in a deployment and transportation profile 146. This strategy is based on an analysis of multiple characteristics as noted herein, such as a number, capability, and mobility of each resource; time constraints defined between workflow steps; duration of the different workflow steps; required tact time of each item being processed; a number of items to be processed; and any specified or preferred transportation protocols, either user-specified or required by the type of item or the type of process being performed. Examples of different transportation strategies that may be utilized include batch transportation and round-robin transportation.

Pathway topologies 148 reflected in transportation protocols may be selected based on pre-defined criteria representing patterns for particular situations, or may be dynamically created based on simulations performed by machine learning modeling engine 170, or according to other criteria. Regardless, the rules engine 150 models input data 110 as described above to determine configuration schemes 147 and one or more pathway topologies 148 embodied in the deployment and transportation profile 146. It is to be understood that different configuration schemes 147 and different pathway topologies 147 may be defined and implemented for different steps within a workflow 104, and therefore more than one workcell 102 may be configured within a workflow 104. The deployment and transportation profile 146 defines at least the required location, orientation, and configuration of each resource for each step in a workflow step 104, as well as any required movement.

Once a deployment and transportation profile 146 is defined and generated by rules engine 150, at block 250 at the appropriate time for each step within workflow 104, framework 100 deploys a mobile robot 106 and/or robotic devices or equipment 108 (or other equipment) comprising a workcell 102 for a self-assembly of the workcell 102 according to the deployment protocols defined therein. At block 260, once the available workcell resources 118 are deployed and in place for any given step of a workflow 104, further protocol instructions are executed by framework 100 to implement the selected pathway topology 148 for the transportation element of the self-assembled workcell 102, until each step in workflow 104 is complete.

Figure 3:
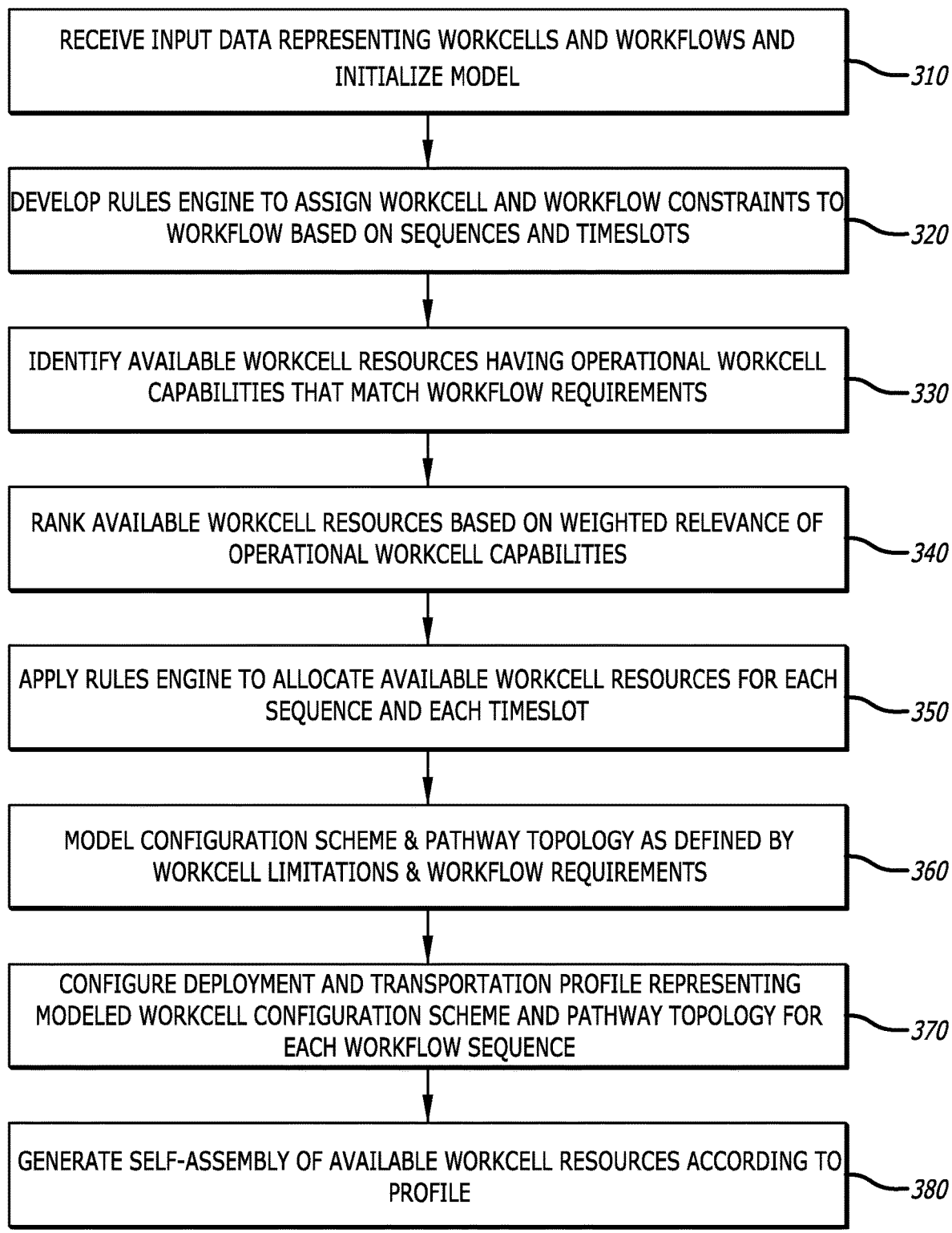
FIG. 3 is a flowchart of steps performed in a process for self-assembly of workcells disclosed herein.

FIG. 3 is a flowchart illustrating steps in an exemplary process 300 for performing at least a portion of framework 100, according to another aspect of the present invention. Framework 100 receives input data 110 that represents both workcells 102 and workflows 104 as described above, as well as any additional information needed, such as for example information representing a mobile robot 106, robotic devices or equipment 108 for use with a mobile robot 106, and any other devices that may be utilized in a workcell 102 or a workflow 104, at step 310. Process 300 then initializes the deployment and transportation model 144, by developing a rules engine 150 at step 320 for the performance of a workflow 104 and self-assembly of workcells 102. The rules engine 150 is configured to apply the input data 110 and, as noted in step 320, is developed by assigning workcell and workflow constraints 111 based on the workflow parameters representing at least the workflow order and scheduling information 114. At step 330, the development of the rules engine 150 continues by identifying available workcell resources 118 having operational workcell capabilities 117 that match spatial and temporal workflow requirements 112, and which are temporally available during the required timeslots 116.

At step 340, process 300 continues development of rules engine 150 by ranking available workcell resources 118 based on a weighted relevance of the operational workcell capabilities 117 for the one or more sequences 115 for executing the performance of workflow 104. As noted herein, workcell and workflow constraints 111 at least represent spatial and temporal requirements 112 of the at least one workflow 104, and spatial and temporal characteristics 113 of each workcell 102. At step 350, rules engine 150 is then applied to allocate available workcell resources 118 for each required sequence 115 and required timeslot 116 relative to a workflow 104.

Process 300 then models a configuration scheme for workcell 102 as a deployment element thereof, and generates protocols for such a configuration scheme 147, as well as one or more pathway topologies for the workcell 102 for each workflow sequence 115 and generates protocols for such pathway topologies 148, as a transportation element thereof, at step 360. Rules engine 150 then configures a deployment and transportation profile 146 at step 370. Process 300 then applies the deployment and transportation profile 146 to execute the deployment protocols 147 and transportation protocols 148 that configure, at step 380, the available workcell resources 118 to generate a self-assembly of a workcell 102, as well as to execute performance of a workflow 104.

As noted above, workcells 102 may be characterized as device-level elements of a laboratory process, and have both spatial and temporal considerations when modeling configuration schemes 147 and pathway topologies 148 for executing workflows 104. Such workcells 102 are further characterized in that they are comprised of mobile robots 106, which may include one or more specific robotic devices or equipment 108. Mobile robots 106 are capable of motion, and it is along these pathway topologies 148 that such workcells 102 operate when carrying out the tasks assigned thereto.

Each mobile robot 106 may be comprised of multiple components. These components may include a base, such as a commercially-available autonomous ground vehicle (AGV) base that provides for navigation, drive, battery power, and serves a mounting platform. The base may also house software and hardware components, such as a control processing unit(s) and control software. The control software may be either configured on board a mobile robot, or remotely accessed therefrom. Mobile robots 106 may also include a network connectivity interface, such as for example Wi-Fi or Bluetooth® components, which may also be integrated into control processing units and/or the AGV base.

Mobile robots 106 may also include software that provides a vision system at least for fine localization for drop-off and pickup of plates and items involved in workflows 104. The vision system may include hardware such as a camera or cameras, mounted on the either the base or some portion of mobile robot 106, such as a robotic arm, that is fixed with respect to mobile robot 106 at least when instructed to move to a specified location used to capture a series of images from which at least location information is determined. The software system associated with the vision system may be included onboard a mobile robot 106 or remotely accessed therefrom, and may include components for controlling the camera or cameras and pixel data processing in images collected by the camera or cameras.

One or more additional components may also be mounted on mobile robots 106, depending on the configuration thereof and the intended use for the mobile robot 106. This may include specific robotic devices or equipment 108 for handling and processing plates and items, such as a collaborative robotic arm, instruments used to perform experiments, and storage components used for on-board storage of such plates and items, such as for example a random-access microtiter plate storage. Software systems for controlling and processing data in these additional components may also include on board a mobile robot 106, or remotely accessed therefrom. It is to be understood that any number of additional components may be included, and therefore a mobile robot 106 in the present invention may have many different configurations.

One example of a mobile robot configuration is a transfer robot that is used to move items between instruments, workcells 102, and pickup/drop-off stations. A transfer robot may also serve as the core transportation mechanism in a self-assembling workcell or between self-assembling workcells. A transfer robot may include several specific elements and characteristics for carrying out these functions in the present invention. For example, a transfer robot may include storage elements mounted thereon, which may be mounted to a portion of the transfer robot. In one embodiment, the storage components are mounted on a back portion of the transfer robot, out of the way of other components such as robotic arms and cameras. The storage elements may be independent of the transfer robot, such that they can easily be detached or removed and adapted to another platform or mobile robot 106.

Vision systems and robotic arms function independently of the mobile robot itself, and therefore do not themselves require precise navigation or a physical docking mechanism to align with pickup/drop-off stations. As with the storage elements, the vision system components and robotic arms may also easily be detached or removed and adapted to another platform or mobile robot 106.

Instrument robots are mobile robots 106 that include one or more instruments for performing actions on plates or items while on board a mobile robot 106. Instrument robots may be used in conjunction with a transfer robot or workcell 102 involving multiple robots 106 to form a self-assembling workcell 102. Instrument robots, as well as transfer robots, may alternatively assemble in a specific location, and remain in a fixed position while tasks are performed.

Storage robots are robots specifically configured with storage elements thereon, as noted above. One example of a storage element includes a random-access microtiter plate storage component mounted thereto, but it is to be understood that many other storage elements are also possible. For example, larger storage elements may also be utilized, such as carousels. Regardless, storage robots are configured for automated plate or item storage, either ambient and/or environmentally controlled. Storage robots may be used in conjunction with standard non-moving workcells, and self-assembling workcells 102, to provide plates and items for processing in a workflow 104. In one embodiment, mobile robots 106 with storage capabilities thereon provide for separation and isolation where plates and items processed thereon have different cell lines or other characteristics where specimens being processed require protection from cross-contamination. Specimens from one cell line can be stored with specimens from a different cell line are processed in a different workflow 104, thereby lowering the risk of cross contamination where the same incubator is used for multiple cell lines, for example while running simultaneous workflows 104 involving the same workcell 102. Mobile robots 106 may also integrate temperature-controlled storage elements, such as incubators, as well as storage elements that are capable of slightly shaking plates or specimens where such actions are required.

Mobile robots 106 may also be configured to move instruments around from workcell to workcell, rather than moving plates or specimens, such that plates or specimens remain stationary on workcells 102 and the instruments used to perform tasks are moved around in a workflow 104. Mobile robots 106 may also configured to process samples while in transit. For instance, a plate may be imaged using an onboard imager while it is being transferred from a liquid handling platform to storage.

As noted above, many transportation strategies are possible. For example, the present invention is applicable where tasks involve processing of plates or specimens in either a batch or round-robin approach, or both.

In a workcell configuration involving a round robin processing schedule using a mobile robot, multiple plates may be cycled through a workcell 102. Each plate progresses individually as instruments become available. In an exemplary workflow 104 using round robin processing, a plate is retrieved from storage, and a mobile robot 106 transports the plate for processing on a first instrument.

Mobile robot 106 then transports the plate for processing on a second instrument, and so forth until all processing on plate is completed, and returns it to storage.

In a workcell configuration involving a batch processing schedule using a mobile robot, plates may be processed in batches, where the mobile robot transports multiple plates to an instrument for sequential batch processing, and then moves them all to the next step. In an exemplary workflow 104 using batch processing, multiple plates are retrieved from storage, and a mobile robot 106 loads instructions for a batch (1 ... n) of plates into its random-access storage. The mobile robot 106 moves to a first instrument, and processes the entire batch (1 ... n) thereon by unloading and loading one plate at a time and repeating for all plates in that batch. The mobile robot 106 then moves to the second instrument, and unloads and loads one plate at a time for processing on the second instrument, again repeating for all plates in that batch. This process is repeated for all instruments, and then the plates are transported back to storage.

One example of a workflow 104 in the present invention is an imaging workflow, in which the vision system described above is used to handoff a plate or item to be processed from one mobile robot 106 and placed in a particular location on or at another mobile robot 106. In this example, a mobile robot 106 is commanded to go to a specified location, and when the mobile robot 106 reaches the location, a series of images are taken using camera which is fixed with respect to a robotic arm configured with the mobile robot 106 at a known location. The coordinates of a location code representing a target object, or plate, such as for example a glyph, are determined from analyzing pixels in the image, and workflow 104 compares a distance between location codes from the current image and/or prior images to the last image. If the distance is greater than a specified amount, the camera continues to collect images until it reaches a predetermined maximum number of images. If the distance is less than the specified amount, the robotic arm on the mobile robot base is activated and instructions are generated to command the robotic arm to grasp the object and pick it up. If a location code is not found in the images that are taken, the mobile robot 106 backs up, and then moves towards the specified location again, to collect further images. This process may repeat any number of times as predetermined by the user until either the object is grasped, or an error state ends the process.

Glyphs, such as markers or stickers, may be added to existing equipment such as bench top equipment, to easily enable mobile robot 106 to access that equipment for loading/unloading using the vision system described above. This allows for integration between mobile robots 106 without any customized software or engineering.

The following further example of a camera calibration workflow in the present invention also illustrates the use of the vision system involving a camera system that is fixed with respect to a robotic arm. In this example, a plate with a location code is held in gripping elements of a robotic arm. The robotic arm moves to a specified point, and pauses for a specified amount of time. The camera system images the code on the plate, and the robotic arm moves to another location a specified distance from the first location and again pauses for a specified amount of time. The camera system then images the code on the plate again. The image data is recorded and used to correlate the distance and angle between the camera and robot arm coordinate frames.

An onboard vision system may also be used, in a further embodiment, to direct the robotic arm. Given that the introduction of mechanical docking devices in a workflow environment may hinder precise alignment between mobile robot 106 and the handoff or instrument nest, the onboard vision system may be advantageous for controlling components of a mobile robot 106 so that handoff sequences occur without having to use any docking infrastructure. This also allows for variances in the location of the mobile robot 106, as most of the robots used have a variance in acceptable positioning accuracy.

Each instrument nest has a glyph, or other feature recognizable by the vision system, that is in a fixed position relative to the nest. When the robot arm is taught the location of the nest, an image is also taken of the glyph and associated with that location. On future approaches to this position, a new image is taken and compared to the original image of the glyph location. The translation for the arm to reach the nest is then calculated based on the differences between the two images, and the arm is directed to this new calculated location for pickup/drop-off.

Input data 110 may also include equipment data as noted above. For example, mobile robots 106, and robotic devices or equipment 108 to be used in a workcell 102, may register their operational capabilities and any constraints with a server or via a registration service, prior to being modeled for use in a workcell 102 or workflow 104. Equipment data may include details relative to location of onboard handoff nests and vision tags. It may also include physical details such as size or dimensions of mobile robot 106 or robotic devices or equipment 108, other specific hardware configurations, and details of software and/or middleware installed thereon, including but not limited to versions thereof. Other information provided may include navigational constraints, accessible locations and stations, and specific capabilities.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs (central processing units), GPUs (graphics processing units), TPUs (tensor processing units), and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

Aspects of the present specification can also be described by the following embodiments:

1. A method, comprising: receiving, as input data, workcell and workflow constraints for a performance of at least one workflow for a laboratory process, the workcell and workflow constraints at least representing spatial and temporal requirements of the at least one workflow, and spatial and temporal limitations of each workcell in one or more workcells, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing available workcell resources that include one or more of timing requirements, mobility, location, battery characteristics, and historical reliability of each workcell; modeling the input data in a plurality of data processing modules within a computing environment that includes one or more processors and at least one computer-readable non-transitory storage medium having program instructions stored therein which, when executed by the one or more processors, cause the one or more processors to execute the plurality of data processing modules to define an automated assembly of the one or more workcells for the performance of the at least one workflow, by developing a rules engine for analyzing the available workcell resources for the performance of the at least one workflow to assign the workcell and workflow constraints based on the one or more parameters to the at least one workflow, by identifying the available workcell resources having operational workcell capabilities that match the requirements of the at least one workflow and which are temporally available during the required timeslots, and ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell, applying the rules engine to the at least one workflow, by allocating an available workcell resource for each sequence and each timeslot, and modeling one or more configuration schemes for a deployment of allocated available workcell resources, and one or more pathway topologies for performing each sequence defined by the spatial and temporal requirements of the at least one workflow, and spatial and temporal limitations of each workcell, and configuring a deployment and transportation profile representing the configuration scheme and the one of the one or more pathway topologies for the available workcell resources assigned to the at least one workflow; and automatically assembling the available workcell resources according to the deployment and transportation profile.

2. The method of embodiment 1, further comprising generating one or more instructions to deploy the available workcell resources to automatically assemble the one or more workcells.

3. The method of embodiment 1 or 2, further comprising executing the at least one workflow in the selected one of the one or more pathway topologies from the deployment and transportation profile.

4. The method of any one of embodiments 1-3, further comprising selecting one of the one or more configuration schemes for deployment of allocated available workcell resources, and selecting one of the one or more pathway topologies, for the available workcell resources assigned to the at least one workflow.

5. The method of any one of embodiments 1-4, further comprising applying the deployment and transportation profile to a support tool configured to provide output data to a user relative to the performance of the at least one workflow.

6. The method of any one of embodiments 1-5, wherein each workcell includes at least one robotic device configured to perform at least a portion of the at least one workflow, in one or more steps of the at least one workflow, and wherein the at least one robotic device is configured to handle multiple plates representing items processed in the at least one workflow.

7. The method of embodiment 6, wherein the one or more pathway topologies represent a round robin scheduling process, wherein multiple plates are cycled through the process and progress individually as instruments become available.

8. The method of embodiment 6, wherein the one or more pathway topologies represent a batch process, wherein multiple plates are processed in batches, and the multiple plates are transported together to an instrument for sequential batch processing in a subsequent step of the at least one workflow.

9. The method of any one of embodiments 6-8, further comprising monitoring the performance of the at least one workflow, and ingesting additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

10. The method of any one of embodiments 6-9, further comprising dynamically adjusting at least one of the one or more configuration schemes for the deployment of allocated available workcell resources and the one or more pathway topologies based on the additional workcell and workflow constraints.

11. The method of any one of embodiments 1-10, wherein the one or more configurations scheme for the deployment of allocated available workcell resources and the one or more pathway topologies are modeled based on one or more of a number, a capability, an orientation, a location and a mobility of each available workcell resource, timing requirements defining periods between the one or more sequences for the at least one workflow, a duration of the one or more sequences, and a required tact time of each item being processed in each workcell, and a number of items processed during each sequence.

12. The method of any one of embodiments 1-11, wherein at least the one or more pathway topologies are based on pre-defined patterns for a specific item processed in the at least one workflow.

13. A method, comprising: developing a deployment and transportation model configured to analyze available workcell resources for an automated assembly of one or more workcells for a performance of at least one workflow for a laboratory process, the deployment and transportation model analyzing workcell and workflow constraints for the performance of the at least one workflow, the workcell and workflow constraints at least representing spatial and temporal requirements of the at least one workflow, and spatial and temporal limitations of each workcell, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing the available workcell resources that include one or more of timing requirements, mobility, location, battery characteristics, and historical reliability of each workcell, the deployment and transportation model developed by identifying the available workcell resources having operational workcell capabilities that match the requirements of the at least one workflow and which are temporally available during the required timeslots, ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell, assigning the workcell and workflow constraints based on the one or more parameters to the at least one workflow, allocating an available workcell resource for each sequence and each timeslot, and identifying one or more configuration schemes for a deployment of allocated available workcell resources and one or more pathway topologies for performing each sequence defined by the spatial and temporal requirements of the at least one workflow, and spatial and temporal limitations of each workcell; and automatically assembling the one or more workcells according to the deployment and transportation model, and executing the selected one of the one or more pathway topologies to perform the at least one workflow.

14. The method of embodiment 13, further comprising generating one or more instructions to deploy the available workcell resources to automatically assemble the one or more workcells.

15. The method of embodiment 13 or 14, further comprising selecting one of the one or more configuration schemes to deploy the allocated available workcell resources, and selecting one of the one or more pathway topologies, for the available workcell resources assigned to the at least one workflow.

16. The method of embodiment 15, further comprising generating a deployment and transportation profile representing the selected one of the configuration schemes and the selected one of the one or more pathway topologies for the available workcell resources assigned to the at least one workflow, and applying the development and transportation profile to a support tool configured to provide output data to a user relative to the performance of the at least one workflow.

17. The method of any one of embodiments 13-16, wherein each workcell includes at least one robotic device configured to perform at least a portion of the at least one workflow, in one or more steps of the at least one workflow, and wherein the at least one robotic device is configured to handle multiple plates representing items processed in the at least one workflow.

18. The method of embodiment 17, wherein the one or more pathway topologies represent a round robin scheduling process, wherein multiple plates are cycled through the process and progress individually as instruments become available.

19. The method of embodiment 17, wherein the one or more pathway topologies represent a batch process, wherein multiple plates are processed in batches, and the multiple plates are transported together to an instrument for sequential batch processing in a subsequent step of the at least one workflow.

20. The method of any one of embodiments 17-19, further comprising monitoring the performance of the at least one workflow, and ingesting additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

21. The method of any one of embodiments 17-20, further comprising dynamically adjusting the one or more pathway topologies based on the additional workcell and workflow constraints.

22. The method of any one of embodiments 13-21, wherein the one or more pathway topologies are modeled based on one or more of a number, a capability, an orientation, a location and a mobility of each available workcell resource, timing requirements defining periods between the one or more sequences for the at least one workflow, a duration of the one or more sequences, and a required tact time of each item being processed in each workcell, and a number of items processed during each sequence.

23. The method of any one of embodiments 13-22 wherein at least the one or more pathway topologies are based on pre-defined patterns for a specific item processed in the at least one workflow.

24. A system comprising: a data collection module configured to receive input data comprised of workcell and workflow constraints for a performance of at least one workflow for a laboratory process, the workcell and workflow constraints at least representing spatial and temporal requirements of the at least one workflow, and spatial and temporal limitations of each workcell, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing available workcell resources that include one or more of timing requirements, mobility, location, battery characteristics, and historical reliability of each workcell; and a deployment and transportation model configured to analyze the available workcell resources for an automated assembly of one or more workcells for the performance of the at least one workflow, by identifying the available workcell resources having operational workcell capabilities that match the requirements of the at least one workflow and which are temporally available during the required timeslots, ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell, assigning the workcell and workflow constraints based on the one or more parameters to the at least one workflow, allocating an available workcell resource for each sequence and each timeslot, and identifying one or more configuration schemes for a deployment of allocated available workcell resources and one or more pathway topologies for performing each sequence defined by the spatial and temporal requirements of the at least one workflow, and spatial and temporal limitations of each workcell, wherein the one or more workcells are automatically assembled according to the deployment and transportation model, and the one or more pathway topologies are executed to perform the at least one workflow.

25. The system of embodiment 24, wherein the deployment and transportation model is further configured to generate one or more instructions to deploy the available workcell resources to automatically assemble the one or more workcells.

26. The system of embodiment 24 or 25, wherein the deployment and transportation model is further configured to select one of the one or more configuration schemes of the deploy the allocated available workcell resources, and selecting one of the one or more pathway topologies, for the available workcell resources assigned to the at least one workflow.

27. The system of embodiment 26, wherein the deployment and transportation model is further configured to generate a deployment and transportation profile representing a selected configuration scheme and a selected one of the one or more pathway topologies for the available workcell resources assigned to the at least one workflow, and applies the development and transportation profile to a support tool configured to provide output data to a user relative to the performance of the at least one workflow.

28. The system of any one of embodiments 24-27, wherein each workcell includes at least one robotic device configured to perform at least a portion of the at least one workflow, in one or more steps of the at least one workflow, and wherein the at least one robotic device is configured to handle multiple plates representing items processed in the at least one workflow.

29. The system of embodiment 28, wherein the one or more pathway topologies represent a round robin scheduling process, wherein multiple plates are cycled through the process and progress individually as instruments become available.

30. The system of embodiment 28, wherein the one or more pathway topologies represent a batch process, wherein multiple plates are processed in batches, and the multiple plates are transported together to an instrument for sequential batch processing in a subsequent step of the at least one workflow.

31. The system of any one of embodiments 28-30, wherein the deployment and transportation model is further configured to monitor the performance of the at least one workflow, and model additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

32. The system of any one of embodiments 28-31, wherein the deployment and transportation model is further configured to dynamically adjust at least one of the one or more configuration schemes and the one or more pathway topologies based on the additional workcell and workflow constraints.

33. The system of any one of embodiments 24-32, wherein the one or more pathway topologies are modeled based on one or more of a number, a capability, an orientation, a location and a mobility of each available workcell resource, timing requirements defining periods between the one or more sequences for the at least one workflow, a duration of the one or more sequences, and a required tact time of each item being processed in each workcell, and a number of items processed during each sequence.

34. The system of any one of embodiments 24-33, wherein at least the one or more pathway topologies are based on pre-defined patterns for a specific item processed in the at least one workflow.

35. A system comprising: one or more mobile robots and additional equipment, comprising available workcell resources for at least one workcell in a laboratory process for performing at least one workflow; and a deployment and transportation model comprised of a plurality of instructions for executing computer code that analyzes workcell and workflow constraints for a performance of the at least one workflow, and operational workcell capabilities representing the available workcell resources that include one or more of timing requirements, mobility, location, battery characteristics, and historical reliability of each workcell, wherein the deployment and transportation model identifies the available workcell resources having operational workcell capabilities that match the requirements of the at least one workflow and which are temporally available during required timeslots, ranks the available workcell resources based on a weighted relevance of the operational workcell capabilities for one or more sequences for executing the performance of the at least one workflow during the required timeslots, assigns the workcell and workflow constraints to the at least one workflow, allocates an available workcell resource for each sequence and each timeslot, and identifies one or more configuration schemes for a deployment of allocated available workcell resources and one or more pathway topologies for performing each sequence defined by spatial and temporal requirements of the at least one workflow, and spatial and temporal limitations of each workcell, and wherein the one or more mobile robots and additional equipment are automatically assembled to form the at least one workcell, and the one or more pathway topologies are executed to perform the at least one workflow.

36. The system of embodiment 35, wherein the workcell and workflow constraints at least represent the spatial and temporal requirements of the at least one workflow, and the spatial and temporal limitations of each workcell, and include workflow order and scheduling information that defines a workflow order for the at least one workflow, the workflow order and scheduling information including one or more parameters of the at least one workflow that include the one or more sequences for executing the performance of the at least one workflow during the required timeslots.

37. The system of embodiment 35, wherein the deployment and transportation model selects one of the one or more configuration schemes for deployment of allocated available workcell resources, and selects one of the one or more pathway topologies for each sequence.

38. The system of embodiment 37, wherein the deployment and transportation model generates a deployment and transportation profile representing a selected configuration scheme and a selected one of the one or more pathway topologies for the available workcell resources assigned to the at least one workflow, and applies the development and transportation profile to a support tool configured to provide output data to a user relative to the performance of the at least one workflow.

39. The system of any one of embodiments 35-38, wherein each workcell includes at least one robotic device in the one or more mobile robots configured to perform at least a portion of the at least one workflow, in one or more steps of the at least one workflow, and wherein the at least one robotic device is configured to handle multiple plates representing items processed in the at least one workflow.

40. The system of embodiment 39, wherein the one or more pathway topologies represent a round robin scheduling process, wherein the multiple plates are cycled through the scheduling process and progress individually as instruments become available.

41. The system of embodiment 39, wherein the one or more pathway topologies represent a batch process, wherein the multiple plates are processed in batches, and the multiple plates are transported together to an instrument for sequential batch processing in a subsequent step of the at least one workflow.

42. The system of any one of embodiments 39-41, wherein the deployment and transportation model monitors the performance of the at least one workflow, and models additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

43. The system of any one of embodiments 39-41, wherein the deployment and transportation model dynamically adjusts at least one of the one or more configuration schemes and the one or more pathway topologies based on the additional workcell and workflow constraints.

44. The system of any one of embodiments 35-43, wherein the one or more pathway topologies are modeled based on one or more of a number, a capability, an orientation, a location and a mobility of each available workcell resource, timing requirements defining periods between the one or more sequences for the at least one workflow, a duration of the one or more sequences, and a required tact time of each item being processed in each workcell, and a number of items processed during each sequence.

44. The system of any one of embodiments 35-44, wherein at least the one or more pathway topologies are based on pre-defined patterns for a specific item processed in the at least one workflow.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step or limitation may be substituted for two or more elements, steps or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A method, comprising:
receiving, as input data, workcell and workflow constraints for a performance of at least one workflow for a laboratory process, the workcell and workflow constraints at least representing spatial and temporal requirements of the at least one workflow, and spatial and temporal limitations of each workcell in one or more workcells, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing available workcell resources that include one or more of timing requirements, mobility, location, battery characteristics, and historical reliability of each workcell;
modeling the input data in a plurality of data processing modules within a computing environment that includes one or more processors and at least one computer-readable non-transitory storage medium having program instructions stored therein which, when executed by the one or more processors, cause the one or more processors to execute the plurality of data processing modules to define an automated assembly of the one or more workcells for the performance of the at least one workflow, by
developing a rules engine for analyzing the available workcell resources for the performance of the at least one workflow to assign the workcell and workflow constraints based on the one or more parameters to the at least one workflow, by identifying the available workcell resources having operational workcell capabilities that match the requirements of the at least one workflow and which are temporally available during the required timeslots, and ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell,
applying the rules engine to the at least one workflow, by allocating an available workcell resource for each sequence and each timeslot, and modeling one or more configuration schemes for a deployment of allocated available workcell resources, and one or more pathway topologies for performing each sequence defined by the spatial and temporal requirements of the at least one workflow, and spatial and temporal limitations of each workcell, and
configuring a deployment and transportation profile representing the configuration scheme and the one of the one or more pathway topologies for the available workcell resources assigned to the at least one workflow; and
automatically assembling the available workcell resources according to the deployment and transportation profile.

2. The method of claim 1, further comprising executing the at least one workflow in the selected one of the one or more pathway topologies from the deployment and transportation profile.

3. The method of claim 1, further comprising selecting one of the one or more configuration schemes for deployment of allocated available workcell resources, and selecting one of the one or more pathway topologies, for the available workcell resources assigned to the at least one workflow.

4. The method of claim 1, wherein each workcell includes at least one robotic device configured to perform at least a portion of the at least one workflow, in one or more steps of the at least one workflow, and wherein the at least one robotic device is configured to handle multiple plates representing items processed in the at least one workflow.

5. The method of claim 4, wherein the one or more pathway topologies represent either a round robin scheduling process, wherein multiple plates are cycled through the process and progress individually as instruments become available, or a batch process, wherein multiple plates are processed in batches, and the multiple plates are transported together to an instrument for sequential batch processing in a subsequent step of the at least one workflow.

6. The method of claim 4, further comprising monitoring the performance of the at least one workflow, and ingesting additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

7. The method of claim 4, further comprising dynamically adjusting at least one of the one or more configuration schemes for the deployment of allocated available workcell resources and the one or more pathway topologies based on the additional workcell and workflow constraints.

8. A method, comprising:
developing a deployment and transportation model configured to analyze available workcell resources for an automated assembly of one or more workcells for a performance of at least one workflow for a laboratory process, the deployment and transportation model analyzing workcell and workflow constraints for the performance of the at least one workflow, the workcell and workflow constraints at least representing spatial and temporal requirements of the at least one workflow, and spatial and temporal limitations of each workcell, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing the available workcell resources that include one or more of timing requirements, mobility, location, battery characteristics, and historical reliability of each workcell, the deployment and transportation model developed by
identifying the available workcell resources having operational workcell capabilities that match the requirements of the at least one workflow and which are temporally available during the required timeslots,
ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell,
assigning the workcell and workflow constraints based on the one or more parameters to the at least one workflow,
allocating an available workcell resource for each sequence and each timeslot, and
identifying one or more configuration schemes for a deployment of allocated available workcell resources and one or more pathway topologies for performing each sequence defined by the spatial and temporal requirements of the at least one workflow, and spatial and temporal limitations of each workcell; and
automatically assembling the one or more workcells according to the deployment and transportation model, and executing the selected one of the one or more pathway topologies to perform the at least one workflow.

9. The method of claim 8, further comprising selecting one of the one or more configuration schemes to deploy the allocated available workcell resources, and selecting one of the one or more pathway topologies, for the available workcell resources assigned to the at least one workflow.

10. The method of claim 8, wherein each workcell includes at least one robotic device configured to perform at least a portion of the at least one workflow, in one or more steps of the at least one workflow, and wherein the at least one robotic device is configured to handle multiple plates representing items processed in the at least one workflow.

11. The method of claim 10, wherein the one or more pathway topologies represent either a round robin scheduling process, wherein multiple plates are cycled through the process and progress individually as instruments become available, or a batch process, wherein multiple plates are processed in batches, and the multiple plates are transported together to an instrument for sequential batch processing in a subsequent step of the at least one workflow.

12. The method of claim 8, further comprising monitoring the performance of the at least one workflow, and ingesting additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

13. The method of claim 8, further comprising dynamically adjusting the one or more pathway topologies based on the additional workcell and workflow constraints.

14. A system comprising:
a data collection module configured to receive input data comprised of workcell and workflow constraints for a performance of at least one workflow for a laboratory process, the workcell and workflow constraints at least representing spatial and temporal requirements of the at least one workflow, and spatial and temporal limitations of each workcell, and including workflow order and scheduling information that defines a workflow order for the at least one workflow, the workflow order and scheduling information including one or more parameters of the at least one workflow that include one or more sequences for executing the performance of the at least one workflow during required timeslots, and operational workcell capabilities representing available workcell resources that include one or more of timing requirements, mobility, location, battery characteristics, and historical reliability of each workcell; and
a deployment and transportation model configured to analyze the available workcell resources for an automated assembly of one or more workcells for the performance of the at least one workflow, by
identifying the available workcell resources having operational workcell capabilities that match the requirements of the at least one workflow and which are temporally available during the required timeslots,
ranking the available workcell resources based on a weighted relevance of the operational workcell capabilities for the one or more sequences for executing the performance of the at least one workflow, the workcell and workflow constraints at least representing spatial and temporal characteristics of the at least one workflow, and spatial and temporal characteristics of each workcell, assigning the workcell and workflow constraints based on the one or more parameters to the at least one workflow, allocating an available workcell resource for each sequence and each timeslot, and identifying one or more configuration schemes for a deployment of allocated available workcell resources and one or more pathway topologies for performing each sequence defined by the spatial and temporal requirements of the at least one workflow, and spatial and temporal limitations of each workcell, wherein the one or more workcells are automatically assembled according to the deployment and transportation model, and the one or more pathway topologies are executed to perform the at least one workflow.

15. The system of claim 14, wherein the deployment and transportation model is further configured to select one of the one or more configuration schemes of the deploy the allocated available workcell resources, and selecting one of the one or more pathway topologies, for the available workcell resources assigned to the at least one workflow.

16. The system of claim 15, wherein the deployment and transportation model is further configured to generate a deployment and transportation profile representing a selected configuration scheme and a selected one of the one or more pathway topologies for the available workcell resources assigned to the at least one workflow, and applies the development and transportation profile to a support tool configured to provide output data to a user relative to the performance of the at least one workflow.

17. The system of claim 14, wherein each workcell includes at least one robotic device configured to perform at least a portion of the at least one workflow, in one or more steps of the at least one workflow, and wherein the at least one robotic device is configured to handle multiple plates representing items processed in the at least one workflow.

18. The system of claim 17, wherein the one or more pathway topologies represent either a round robin scheduling process, wherein multiple plates are cycled through the process and progress individually as instruments become available, or a batch process, wherein multiple plates are processed in batches, and the multiple plates are transported together to an instrument for sequential batch processing in a subsequent step of the at least one workflow.

19. The system of claim 17, wherein the deployment and transportation model is further configured to monitor the performance of the at least one workflow, and model additional workcell and workflow constraints representing adjustments to the laboratory process, the adjustments to the laboratory process generated by at least one of dynamic adjustment of the workflow order and scheduling information by a user, and changes to at least the spatial and temporal limitations of each workcell as the items are processed in the at least one workflow.

20. The system of claim 17, wherein the deployment and transportation model is further configured to dynamically adjust at least one of the one or more configuration schemes and the one or more pathway topologies based on the additional workcell and workflow constraints.

* * * * *